US009606576B2

(12) United States Patent
Mccafferty et al.

(10) Patent No.: US 9,606,576 B2
(45) Date of Patent: Mar. 28, 2017

(54) DISPLAY LOCATION

(71) Applicant: NCR Corporation, Duluth, GA (US)

(72) Inventors: Liam Mccafferty, Angus (GB);
Roderick George Paterson, Perthshire
(GB); Donald I. MacInnes, Angus
(GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/506,799

(22) Filed: Oct. 6, 2014

(65) Prior Publication Data
US 2015/0097101 A1 Apr. 9, 2015

Related U.S. Application Data

(63) Continuation of application No. 13/483,284, filed on May 30, 2012, now Pat. No. 8,876,079.

(51) Int. Cl.
| | |
|---|---|
| *F16M 13/00* | (2006.01) |
| *G06F 1/16* | (2006.01) |
| *G07F 19/00* | (2006.01) |
| *G07G 1/01* | (2006.01) |
| *G07F 9/02* | (2006.01) |

(52) U.S. Cl.
CPC ............ *G06F 1/1601* (2013.01); *G07F 9/023* (2013.01); *G07F 19/205* (2013.01); *G07G 1/01* (2013.01)

(58) Field of Classification Search
CPC . G07F 19/205; G07F 19/201; B60R 11/0235; Y10S 248/922

USPC ............ 248/550, 454, 480, 479, 279.1, 922
See application file for complete search history.

(56) References Cited

U.S. PATENT DOCUMENTS

| | | | | |
|---|---|---|---|---|
| 3,789,140 | A * | 1/1974 | McQueen et al. ............ 348/827 |
| 4,813,475 | A * | 3/1989 | Couvrette ..................... 165/223 |
| 4,856,437 | A * | 8/1989 | Trucksess .................... 109/24.1 |
| 5,125,610 | A * | 6/1992 | Queau ........................ 248/284.1 |
| 5,210,603 | A * | 5/1993 | Sabin ............................ 348/157 |
| 5,353,536 | A * | 10/1994 | Erber et al. .................. 40/606.1 |
| 5,823,054 | A * | 10/1998 | Brouwer ......................... 74/425 |
| 6,322,221 | B1 * | 11/2001 | van de Loo .................. 359/841 |
| 6,328,206 | B1 * | 12/2001 | Schanz et al. ................ 235/379 |
| 6,754,070 | B2 * | 6/2004 | Chen ........................ 361/679.26 |
| 6,812,917 | B2 * | 11/2004 | Jenkins et al. ................ 345/156 |
| 7,337,955 | B1 * | 3/2008 | Block .................. G06Q 20/102 |
| | | | | 235/379 |
| 7,405,773 | B2 * | 7/2008 | Lester et al. .................. 348/825 |
| 7,644,039 | B1 * | 1/2010 | Magee et al. ................... 705/43 |
| 7,684,200 | B2 * | 3/2010 | Watanabe et al. ............ 361/727 |
| 8,360,370 | B2 * | 1/2013 | Probasco et al. ............ 248/27.3 |
| 2005/0166220 | A1 * | 7/2005 | McKay .............................. 725/32 |
| 2006/0262033 | A1 * | 11/2006 | Shen et al. ..................... 345/1.1 |

(Continued)

*Primary Examiner* — Bradley Duckworth
(74) *Attorney, Agent, or Firm* — Schwegman, Lundberg & Woessner

(57) ABSTRACT

A method and apparatus are disclosed for locating a display of a Self-Service Terminal (SST) at a desired viewing angle. The apparatus comprises a display support that supports a display of a Self-Service Terminal (SST) and that is pivotably mounted at an edge region thereof to the terminal; a variable length member that connects a further region of the display support to the terminal; and a motor that selectively varies the length of the member, the edge region and further region being spaced apart to tilt the display at a viewing angle responsive to the length of the variable length member.

14 Claims, 11 Drawing Sheets

(56) References Cited

U.S. PATENT DOCUMENTS

| | | | |
|---|---|---|---|
| 2008/0094786 A1* | 4/2008 | Liou et al. | 361/679 |
| 2008/0149795 A1* | 6/2008 | Oh et al. | 248/276.1 |
| 2010/0126805 A1* | 5/2010 | Oh | 186/37 |
| 2012/0262868 A1* | 10/2012 | Kato | 361/679.21 |
| 2013/0091464 A1* | 4/2013 | Chang et al. | 715/811 |
| 2013/0100014 A1* | 4/2013 | Rabanos et al. | 345/156 |
| 2013/0147847 A1* | 6/2013 | Koseki et al. | 345/660 |

* cited by examiner

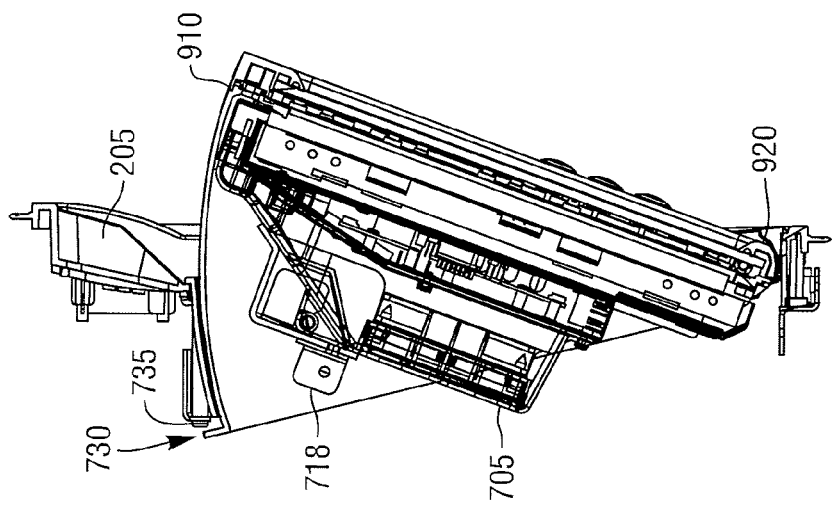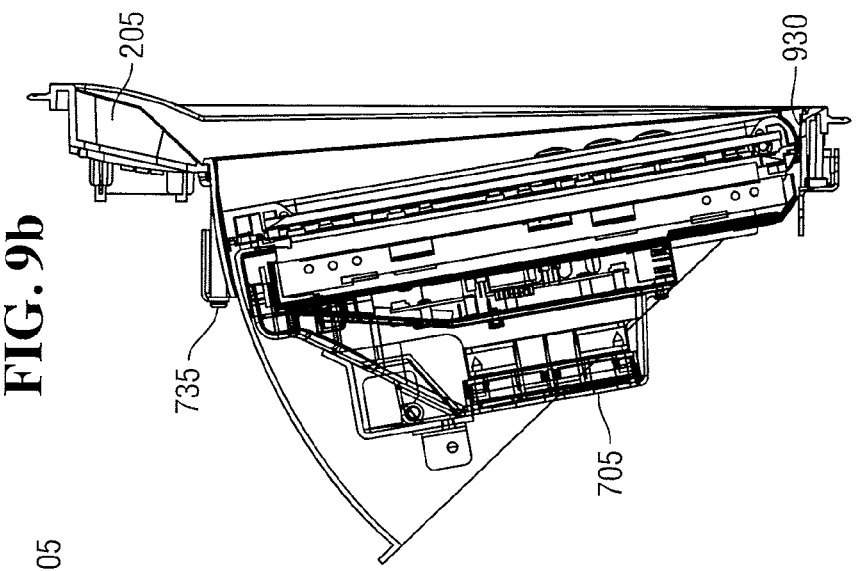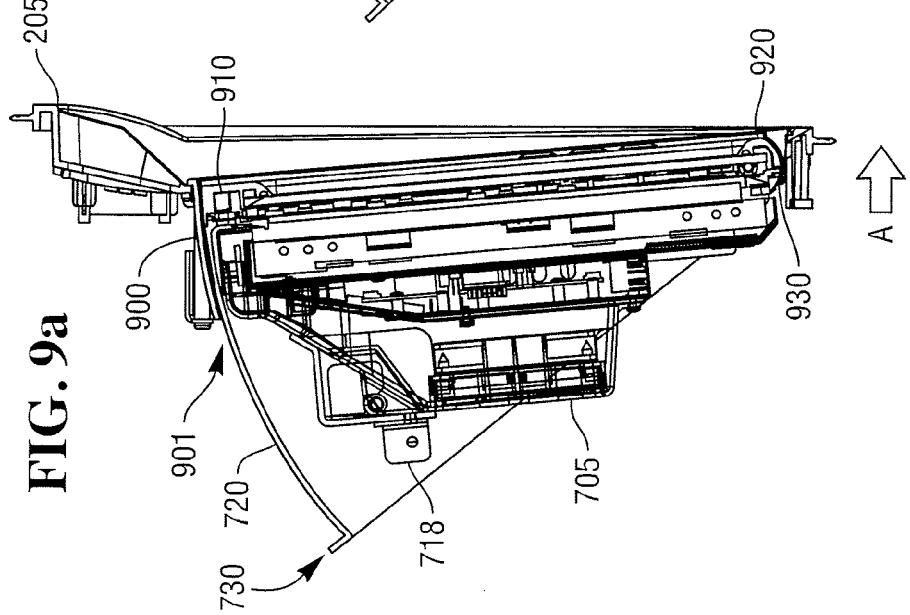

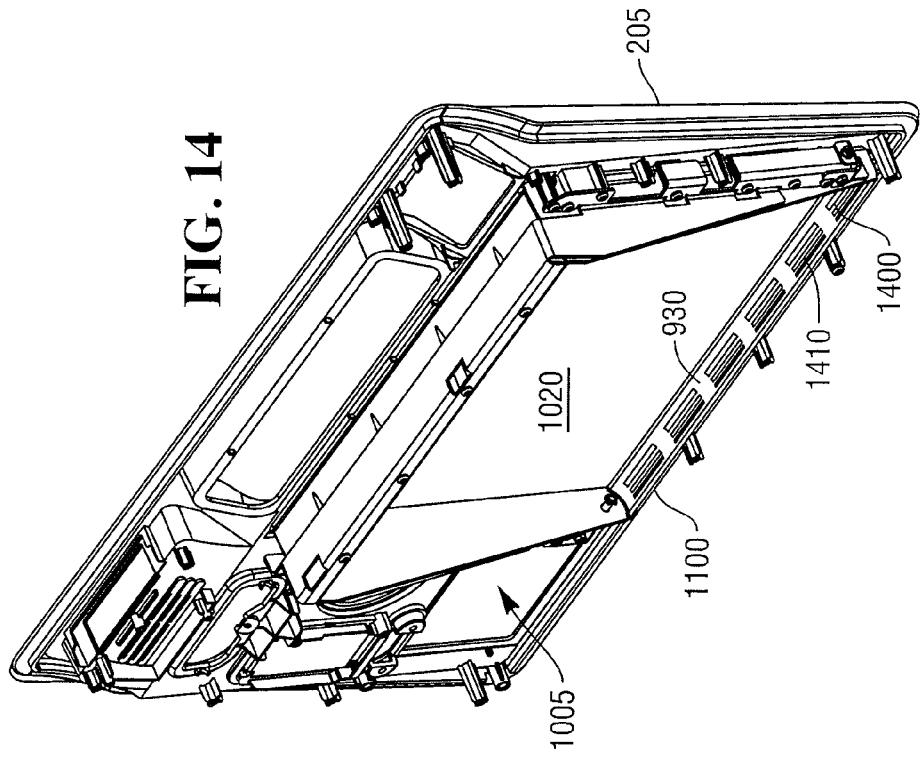
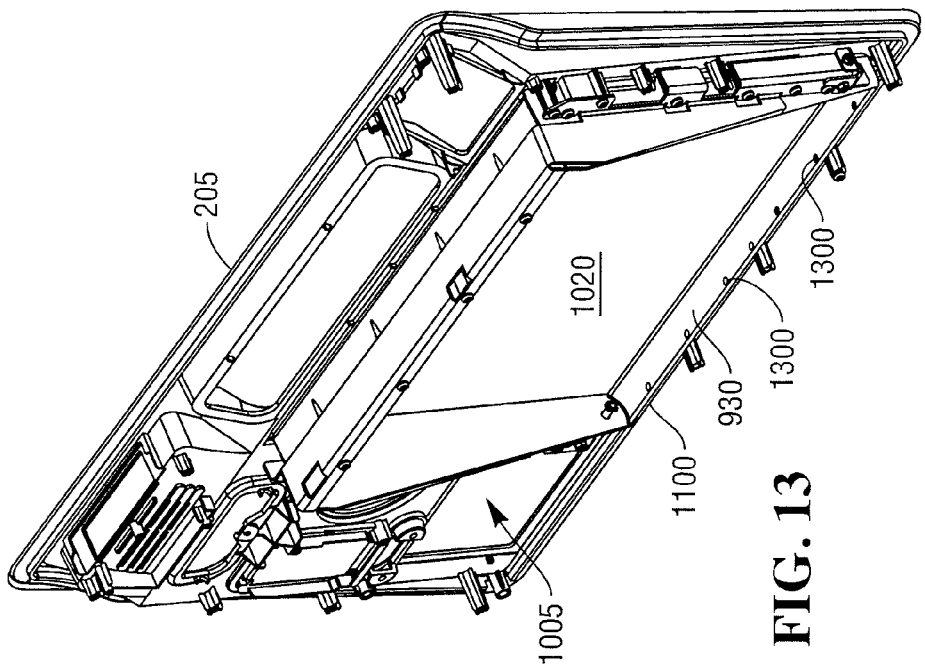

DISPLAY LOCATION

CROSS-REFERENCE TO RELATED APPLICATION

The present application is a continuation application and claims the benefit of the filing date of application Ser. No. 13/483,284, filed May 30, 2012, entitled, "Display Location".

FIELD OF THE INVENTION

The present invention relates to a method and apparatus for locating a display of a Self-Service Terminal (SST). In particular, but not exclusively, the present invention relates to apparatus for tilting a display to an appropriate viewing angle which is simple to use for a user and which is not prone to mechanical failure. The apparatus is also efficient to manufacture and does not require the pre-storage of user data associated with possible users of the terminal in order to achieve a desirable viewing angle when used.

Many situations are known in which Self-Service Terminals (SSTs) are utilized to dispense items of media to a user or via which users can deposit items of media. For example, an Automated Teller Machine (ATM) can be used to dispense currency notes to a user or allow a user to deposit checks and/or currency notes. It is known that, because users can have different physical characteristics or because users of so-called drive-through SSTs may be located in different sized vehicles, presenting a display of the terminal in a way that makes displayed information readable to a user can be problematical. For example, U.S. Pat. No. 7,644,039 discloses how a height and angle of tilt of a display of an ATM can be altered dependent upon pre-stored user characteristics associated with identified users.

Nevertheless, the solution offered by U.S. Pat. No. 7,644,039 suffers from a number of problems. Notably, a user needs to identify themselves prior to a user display being duly located. Errors can occur during this verification procedure since the user may not be able to clearly read initially displayed information. Also, a data store in the terminal, or connected to the terminal, must be provided storing details of each possible user for recall when a particular user wishes to use a terminal. Still furthermore, the solution described in U.S. Pat. No. 7,644,039 utilizes a complicated pneumatic system for raising a height of a display and tilting the display. Such pneumatic systems are prone to error and are complicated to manufacture and maintain. Also, the degree of movement permitted according to the solution shown in U.S. Pat. No. 7,644,039 means that it is difficult to seal in a watertight manner around the moveable screen and this can permit ingress of water or other particular matter which can, over time, cause failure.

SUMMARY OF THE INVENTION

It is an aim of the present invention to at least partly mitigate the above-mentioned problems.

It is an aim of certain embodiments of the present invention to provide a method and apparatus for locating a display of a Self-Service Terminal (SST) at a desired viewing angle which is simple to use for a user and does not utilize complex and costly tilting mechanisms, nor require data to be pre-stored associated with individual users who might use the terminal.

It is an aim of certain embodiments of the present invention to provide an SST including a tilting display that also includes a mechanism which prevents ingress of water or other contaminating particulate matter which might cause failure of the terminal.

It is an aim of certain embodiments of the present invention to provide a water management system on a moveable display of an SST.

It is an aim of certain embodiments of the present invention to provide a drive-through-type ATM in which a display can be readily tilted to an appropriate viewing angle as desired by a user.

According to a first aspect of the present invention there is provided apparatus for locating a display of a Self-Service Terminal (SST) at a desired viewing angle, comprising:

a support that supports a display of a Self-Service Terminal (SST) and that is pivotably mounted at an edge region thereof to the terminal;

a variable length member that connects a further region of the display support to the terminal; and a motor that selectively varies the length of the member, the edge region and further region being spaced apart to tilt the display at a viewing angle responsive to the length of the variable length member.

Aptly, the display support is mounted to the terminal at a first terminal location comprising an upper or lower edge region of the display via at least one pivot pin member.

Aptly, the variable length member is a stiff arm assembly, comprising a worm screw element, pivotably secured at a first end thereof to said display support and at a further end thereof to a further terminal location.

Aptly, the apparatus further includes at least one flag member secured to said display support; and at least one sensor secured to said terminal that detects when said flag is located at at least one pre-determined position.

Aptly, the apparatus further includes a stiff spring coupling member connecting an end of the worm screw element to the terminal.

Aptly, the apparatus further includes a plurality of user buttons, each arranged to drive the motor to a pre-determined position to thereby locate the display at a respective pre-determined viewing angle.

Aptly, the apparatus further includes two user buttons, each arranged to drive the motor in a respective clockwise or anti-clockwise direction.

Aptly, the apparatus further comprises a plurality of user buttons, each arranged to drive the motor to a pre-determined position to thereby locate the display at a respective pre-determined viewing angle.

Aptly, each button is located in a main user interface region of a terminal housing.

Aptly, each button includes a visual cue indicating a respective location of the display support corresponding to an associated viewing angle.

Aptly, each button is a dedicated control button on the terminal and each button is backlit.

Aptly, the apparatus further comprises an inner hood element carried by the display support that extends within the terminal from at least an upper edge region of the display support towards an interior region of the terminal.

Aptly, the inner hood element further extends from spaced apart side edges of the display support and comprises an outwardly turned lip region extending around respective side edges and an upper edge thereof.

Aptly, the apparatus further includes a frame element secured to an aperture in a housing of the terminal and providing a bezel region proximate to an outer peripheral edge of said display support.

Aptly, the frame element comprises a wiper element or gasket element located at least at an upper edge region of the bezel region.

Aptly, the frame element comprises a gully located at a lower edge region of the bezel region.

Aptly, the apparatus further comprises at least one throughhole in the gully.

Aptly, each throughhole comprises a drainage hole or drainage grill.

Aptly, the apparatus further comprises an air blower that blows air onto at least the inner hood element.

Aptly, the air blower is a heated air blower.

According to a second aspect of the present invention there is provided a method of locating a display of a Self-Service Terminal (SST) at a desired viewing angle, comprising the steps of:
  supporting a display of a Self-Service Terminal (SST) via a display support that is pivotably mounted at an edge region thereof to the terminal;
  via a motor, varying a length of a variable length member that connects a further region of the display support to the terminal; and
  tilting the display at a viewing angle responsive to a length of the variable length member.

Aptly, the method further comprises the step of tilting the display by tilting the display support about at least one pivot pin member as the length of the variable length member.

Aptly, the method further comprises the step of fixing an angle of tilt to provide a desired viewing angle for the display by releasably preventing rotation of a worm screw element of the variable length member.

Aptly, the method further comprises the step of rigidly supporting the display at the fixed angle of tilt.

Aptly, the method further comprises the step of determining when an angle of tilt is at a pre-determined position by detecting a position of a flag member on the display support via at least one sensor.

Aptly, the method further comprises the step of, at switch-on, energizing the motor to drive the worm screw element to a pre-determined length at which the display is angled at a corresponding "home" viewing angle.

Aptly, the method further comprises the step of selectively rotating the worm screw element in a clockwise or anti-clockwise direction responsive to a press on a respective user button of the terminal.

Aptly, the method further comprises the step of, subsequent to receiving a press on a user button, determining a current position of the motor, determining a desired position of the motor corresponding to a viewing angle associated with the pressed user button and rotating the worm screw element via the motor responsive to a difference between the current position and the desired position.

Aptly, the method further comprises the step of de-coupling an impact of the display from the motor via a stiff spring element connecting an end of the worm screw element to the terminal.

Aptly, the method further comprises the step of, as the display is tilted, preventing ingress of fluid to a rear region of the display via a hood element carried by the display support.

Aptly, the method further comprises the step of collecting fluid from the hood element in a lip region of the hood element.

Aptly, the method further comprises the step of draining collected fluid via a drainage hole or drainage grill in a gully of a frame element secured to an aperture in a housing of the terminal.

Aptly, the method further comprises the step of blowing cold and/or heated air in at least one pre-determined direction onto the inner hood element.

According to a third aspect of the present invention, there is provided apparatus that sets a desired viewing angle for a display, comprising:
  a display that is pivotable with respect to a Self-Service Terminal (SST); and
  a variable length member pivotably connected to the terminal and the display and having a length that determines a pivot position of the display;
wherein
  the length is selectable responsive to activation of at least one terminal user button to tilt the display to a desired viewing angle.

According to a fourth aspect of the present invention, there is provided apparatus that directs ingress of fluid around a tiltable display of a Self-Service Terminal (SST), comprising:
  a frame element that extends around an aperture in a Self-Service Terminal (SST); and
  a display support that supports a display of the SST and that is pivotably mounted at an edge region thereof to the frame; wherein
  the display support comprises an inner hood element and said frame element comprises an outer hood element spaced apart from but proximate to said inner hood element.

Aptly, the frame element comprises a gully comprising at least one throughhole. The throughhole may have any convenient shape; and any convenient number of throughholes may be provided.

Aptly, the apparatus further comprises an air blower that blows air onto at least the inner hood element.

It should now be appreciated that this aspect of the invention has the advantage that ingress of fluid (such as from rain, sleet, hail, or snow) can either be prevented or reduced. Any fluid that is admitted is directed to the gully for egress through one or more apertures disposed therein. This prevents ingress of fluid to any sensitive electronic components located within the SST (such as a control board, or the like).

According to a fifth aspect of the present invention there is provided a Self-Service Terminal (SST) including a display operable to be moved to a desired viewing angle, the terminal comprising:
  a display support coupled to the display, and being pivotably mounted to a body portion of the terminal;
  an adjustable ram coupled between the display support and the body portion of the terminal; and
  a motor coupled to the adjustable ram that selectively varies the length of the adjustable ram to tilt the display to one of a plurality of preset viewing angles responsive to an input received from a user.

Certain embodiments of the present invention provide a user friendly way in which a display of a Self-Service Terminal (SST) can be tilted to a desired viewing angle.

Certain embodiments of the present invention provide a mechanically non-complex solution to the problem of tilting a display to a desired viewing angle without the need for complex pneumatic systems that are prone to error.

Certain embodiments of the present invention provide the advantage that one or more user buttons are provided on an SST which enables a user of the terminal to simply press a button to adjust the angle of tilt/viewing angle of a display to a desired viewing angle. A user does not need to verify themselves prior to being able to move the display to a desired viewing angle. This can avoid user error and avoids the need for data to be stored for each user.

Certain embodiments of the present invention provide a method and apparatus which can be utilized to manage rainwater and/or ingress of contaminating particulate matter on a tilting display SST. This helps avoid failure of the SST.

BRIEF DESCRIPTION OF DRAWINGS

Embodiments of the present invention will now be described hereinafter, by way of example only, with reference to the accompanying drawings in which:

FIGS. 9a, 9b, and 9c illustrate a pivoting display and hood in different orientations;

FIG. 13 illustrates drainage holes in the gully of a frame that surrounds a display;

FIG. 14 illustrates drainage grills in the gully of an alternative frame that surrounds a display.

DESCRIPTION OF EMBODIMENTS

Figure 1:
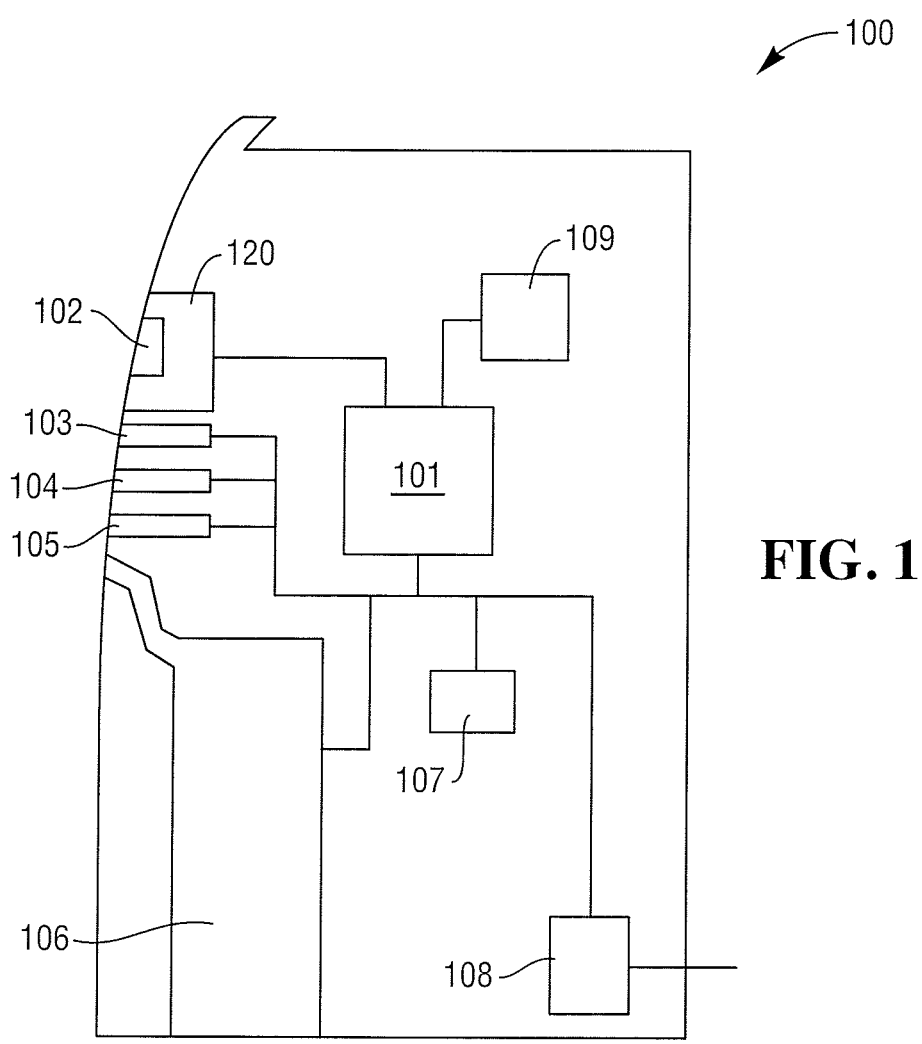
FIG. 1 illustrates a drive-through Automated Teller Machine (ATM) according to an embodiment of the present invention.

In the drawings like reference numerals refer to like parts.

FIG. 1 illustrates a block diagram of a Self-Service Terminal 100 in the form of a drive-through Automated Teller Machine (ATM) according to one embodiment of the present invention. It will be understood that certain embodiments of the present invention are applicable to other types of Self-Service Terminals (SSTs) such as ATMs, vending machines, change machines and the like.

The ATM 100 includes different modules for enabling transactions to be executed and recorded by the ATM 100. These ATM modules include customer transaction modules and service personnel modules. The ATM modules include an ATM controller 101, a customer display 102, a card reader/writer module 103, an encrypting keypad module 104, a receipt printer module 105, a cash dispenser module 106, a journal printer module 107 for creating a record of every transaction executed by the ATM, a connection module 108, an operator panel module 109 for use by a service operator (such as a field engineer, a replenisher (of currency, of printed paper or the like), or the like).

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers. The ATM also includes a display module 120 which provides a housing for the display 102 as well as a drive system for selectively varying the viewing angle of the display 102.

Figure 2:
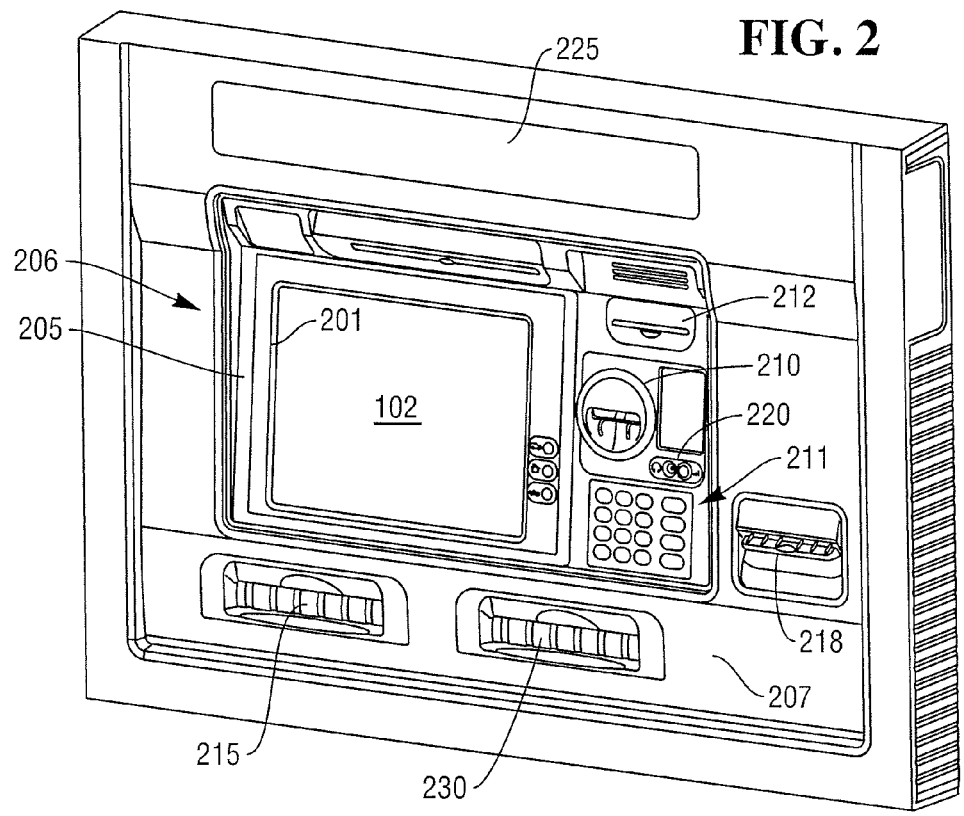
FIG. 2 illustrates the user interface of the ATM shown in FIG. 1.

FIG. 2 illustrates the primary user interface of the ATM 100 in more detail. It will be appreciated that this primary user interface is influential on the customer user experience. More and more these days the functions available, the applications/marketing and corporate branding are elevating the importance of this device and the associated performance. The user interface combines the display 102, in the form of a touchscreen display, which can be utilized to provide high quality graphic and animation visualization to a user. The touchscreen display 102 includes a display panel and spaced apart touch panel as will be appreciated by those skilled in the art.

The display 102 itself is framed and supported in place by a display support 201. The support 201 extends circumferentially around the outer edge regions of the touch and display panels of the display 102. Movement of the display support 201 moves the display 102. A frame 205 extends around the edge of the display support 201 to help further define the edges of the display area and also provide a connecting area between the edges of the display support 201 and the aperture 206 provided in the front fascia 207 of the ATM which receives the display 102. The primary user interface also includes a moulding 210 defining a card reader/writer slot which provides an interface between the user and the card reader/writer module 103. The primary user interface also includes a keypad 211 which is part of the encrypting keypad module 104. The primary user interface also includes a receipt slot 212 which provides the interface between a user and the receipt printer module 105. The primary user interface also includes a cash dispenser slot 215 which provides an interface between a user and the cash dispenser module 106. The primary user interface also includes a check processing slot 218 which provides the interface between a user and a check processing module (not shown).

The primary user interface can optionally utilize other access ports/slots such as a private audio port 220 and may also optionally include illuminated signage 225. A further cash recycler slot 230 is optionally provided.

Figure 3:
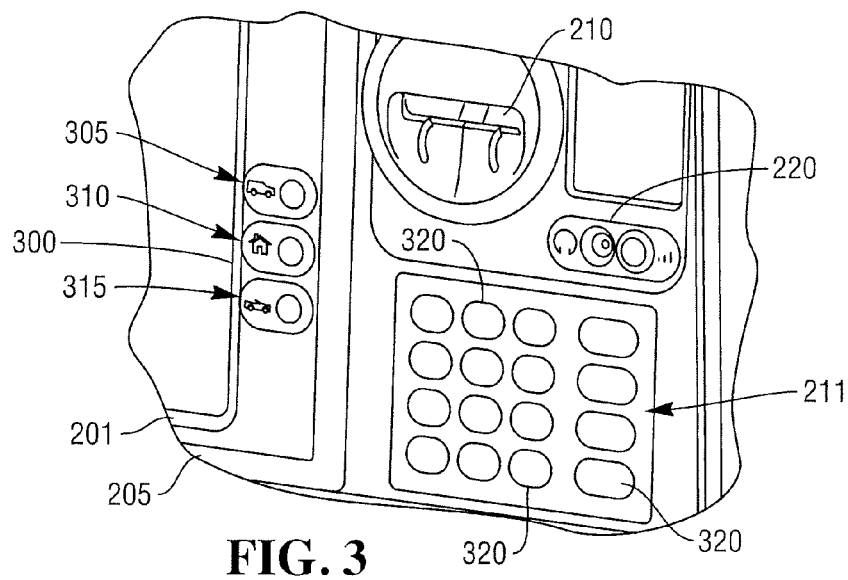
FIG. 3 illustrates parts of the user interface illustrated in FIG. 2 in more detail.

FIG. 3 illustrates parts of the user interface illustrated in FIG. 2 in more detail. More particularly, FIG. 3 illustrates a corner region 300 of the display 102 which is surrounded by part of the support 201 and frame 205. As illustrated in FIG. 3, the part of the support visible from the front of the ATM 100 carries three user buttons. An uppermost user button 305 is an illuminated single press button which displays a visual cue in the form of the picture of a large vehicle. By pressing this button, a user can arrange for the display 102 to be tilted in a slightly backwards fashion since the user is indicating that they are sitting relatively high up in a large vehicle. Their angle of sight with respect to the display 102 is thus more elevated than average. A central user button 310 is an illuminated single press button. This button is also accompanied by a visual cue in the form of the picture of a house/home. This button is pressed by a user to indicate that the user is at an average height and therefore the angle of tilt of the display 102 should be set to remain at a home position. The third lower button 315 is a single press illuminated button. A visual cue in the form of the picture of a low sports vehicle accompanies the button. By pressing this button a user indicates that the display 102 should be tilted forwards. That is to say, the user indicates that they are viewing the ATM from a viewpoint below average. FIG. 3 also illustrates how the keypad 211 includes multiple alphanumeric buttons 320 which can be utilized to enter a PIN number and which can be utilized to receive further user input indicating selections.

The display 102 is shown in FIG. 2 in the "home" position. In this position, the display 102 is in an upright position substantially parallel with the primary fascia panel 207 of the ATM. That is to say, the surface of the display 102 is substantially vertical with respect to a floor surface adjacent to the ATM 100 where a user will be positioned.

Figure 4:
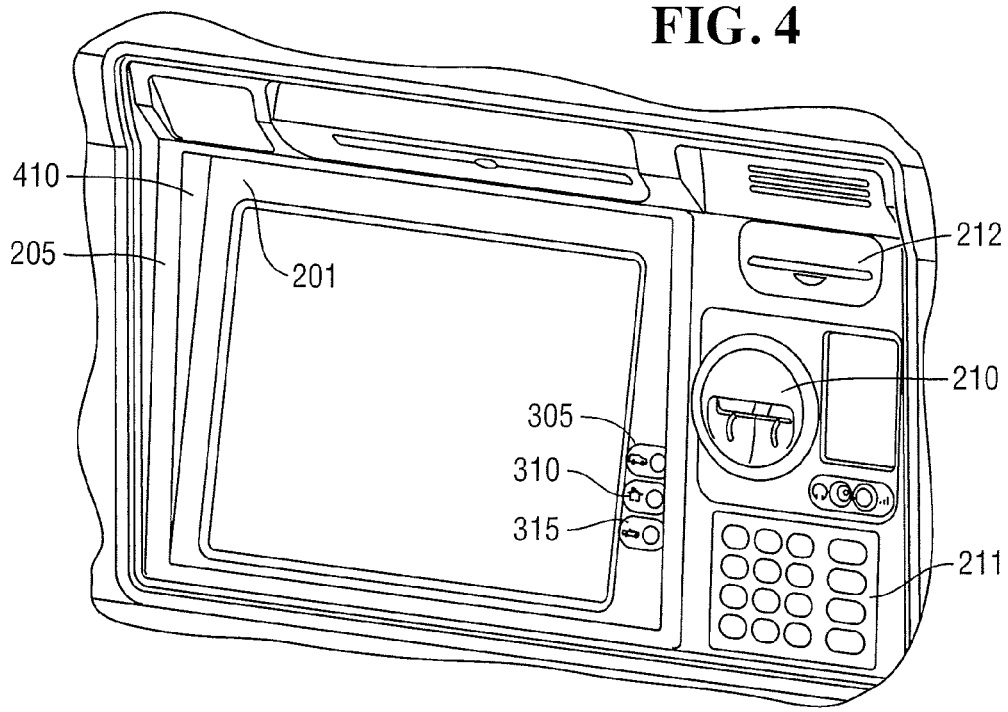
FIG. 4 illustrates a display in a "tilted back" orientation.

FIG. 4 illustrates the display 102 in a "tilted back" orientation. This orientation is selected by a user pressing the uppermost button 305 adjacent to the display 102 to begin a transaction. By pressing this button 305 the user is indicating that they are sitting in a large vehicle and are therefore at an elevated position with respect to the ATM 100. By tilting the display 102 backwards, the user of the vehicle is presented with the display surface substantially fully facing them. This helps minimize the risk that incorrect user selections will be made by a user selecting regions of the touchscreen as options are displayed there.

Figure 5:
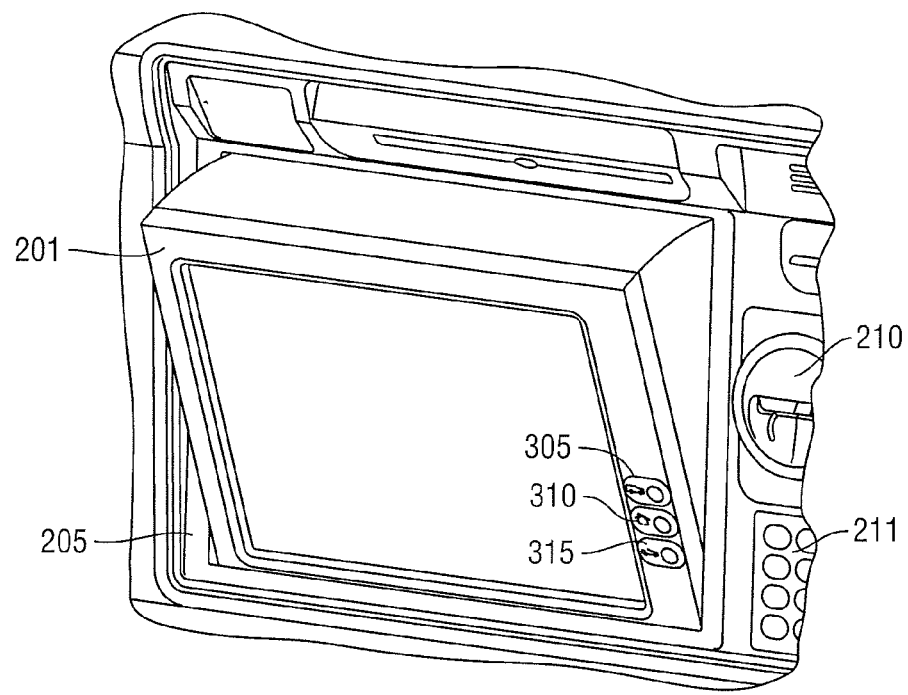
FIG. 5 illustrates a display in a "tilted forward" orientation.

FIG. 4 helps illustrate how the frame 205 which surrounds the aperture in the ATM 100 remains fixed in place with respect to the ATM fascia 207 as the display support 201 and the display 102 itself is tilted. The display 102 is thus tilted with respect to this frame 205 as well as the ATM fascia 207. A gap 410 thus opens at an upper region between this fixed in place frame and the edging of the display 102 provided by part of the support. Rain or unauthorized ingress or other contaminants must be prevented from accessing the region within the terminal when this gap opens. This is achieved using an inner hood on the frame and outer hood on the display support 201, as will be described in more detail below. By contrast to the orientation shown in FIG. 4, FIG. 5 illustrates the display 102 in a "tilted forward" orientation. The display is moved to this orientation subsequent to a user pressing the lowest button 315 at the edge of the display 102. By pressing this button 315 the user is indicating that they are at a relatively low position with respect to the ATM 100 and therefore by tilting the display 102 to the orientation shown in FIG. 5, the user is presented with a more full-on view of the display 102. This makes the likelihood of error occurring much reduced when a user uses the touchscreen display to make user selections or when interpreting options displayed on the screen prior to utilization of the keypad buttons or other buttons adjacent to the display 102. A hood which moves with the display and which is described further below helps prevent ingress of rain water or unauthorized personnel or contaminants when the display 102 is tilted in this way.

Figure 6:
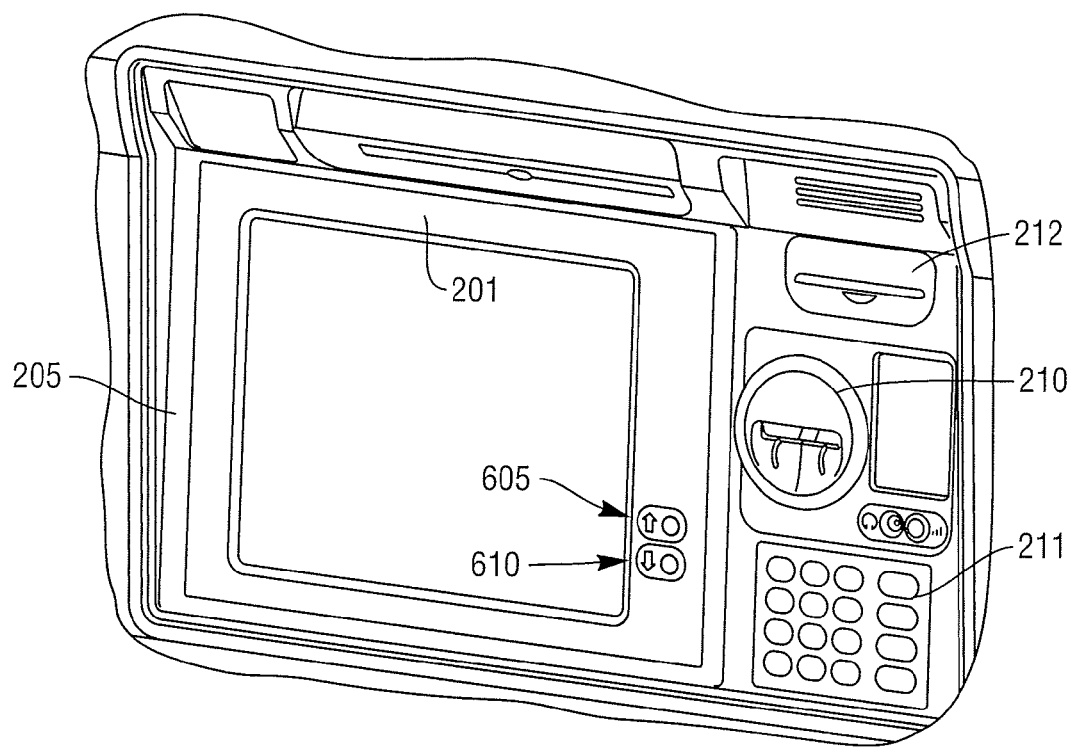
FIG. 6 illustrates an alternative embodiment of the present invention in which two user buttons can be utilized to tilt the display.

FIG. 6 illustrates an alternative embodiment of the present invention in which rather than the three user buttons 305, 310, 315 shown in FIGS. 2 to 5, the display support 201 carries only two user buttons 605, 610. The uppermost user button 605 in FIG. 6 is a single press illuminated user button. A visual cue in the form of an upward directed arrow accompanies the button 605. A user pressing this button 605 indicates that the display 102 is to be tilted back by a pre-determined amount. Alternatively, certain embodiments of the present invention can utilize a press and hold type button in which case a user can hold the button in a pressed state with the display being constantly tilted back until the button is released or the maximum tilt is reached. The lower user button 610 shown in FIG. 6 is also a single press illuminated button. The button 610 is accompanied by a visual cue in the form of a downward directed arrow. A user can press this button 610 to tilt the display 102 forward by a pre-determined amount. Optionally, this button 610 can be a press and hold type button which enables a user to press and hold the button to initiate forward tilting of the display. The button is then released when the angle of tilt is at an angle determined by a user.

Figure 7:
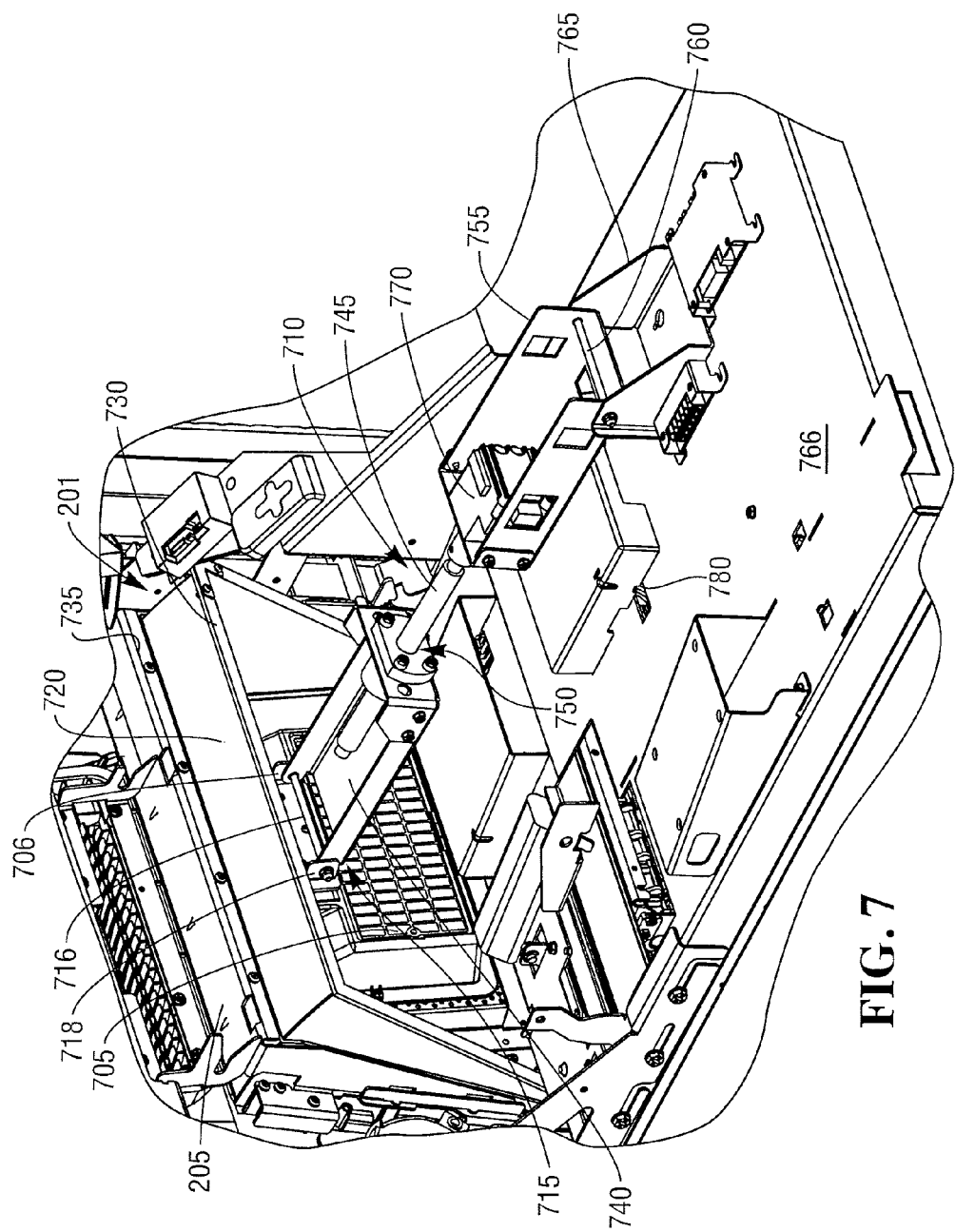
FIG. 7 illustrates how tilting of the display is achieved.

FIG. 7 illustrates how the tiltable display 102 and display support 201 shown in the previous figures may be selectively tilted to a desired angle corresponding to a desired viewing angle for a user of the ATM 100. More particularly, FIG. 7 illustrates certain working parts within the terminal itself. Further parts of the display support 201 are also illustrated in FIG. 7. It is to be appreciated that the display 102 itself of the ATM 100 is provided by a display panel and touch panel and corresponding power and detection circuitry. This is supported by various parts which carry the display 102 with them as the support 201 is moved.

FIG. 7 illustrates a rear access panel 705 which forms part of the display support 201. At an upper region 706 of this access panel 705, a variable length member 710 is connected at a first end thereof 715 to the display support via a pivoting axle 716 which is connected to outstanding lugs 718 which extend from the display support 201. The display 102 and display support 201 shown in FIG. 7 is arranged in a slightly "tilted forward" orientation. In this orientation, the plane of the display panel is tilted forward about a lower edge of the display 102 and display support 201.

FIG. 7 illustrates the reverse side of part of the frame 205 which is fixed in place with respect to the ATM fascia 207 and also illustrates how an inner hood 720 moves as part of the display support 201. In the position shown in FIG. 7, the hood 720 is located in such a way that very little of the hood 720 is visible to a user of the ATM 100. A lip 730 on the hood 720 which helps manage flow of any water moving into the terminal and which extends outwardly from the main body of the hood 720 is shown spaced apart from an abutment surface 735 provided by an edge of the frame 205.

The variable length member 710 is an assembly of a plurality of component parts that together act as a variable length strut that positions the display 102 at an angle of incline responsive to the length of the assembly. The variable length strut is a structural component that helps resist longitudinal compression between the pivot/connection points at either end. At a first end 715, a strut body 740 provides a rigid frame connecting the various pivot points that are connected to the display support to a worm screw 745. The threading on this worm screw extends longitudinally along the length of the screw and mates with matching threading in an open mouth 750 of the variable strut length housing 740. A further end of the worm screw 745 extends towards a further housing 755 which is likewise pivoted at an axle 760 to rigid lugs 765 upstanding from a surface 766 of the terminal. In this way it will be understood that the variable strut length is pivotably connected at two points. One point at one end of the strut is pivotably connected to an upper region of the display support. Another point is pivotably connected to the terminal. A lower edge region of the display support is also pivotably connected to the terminal. The edge of the display support and the upstanding lugs which pivotably support a further end of the variable length strut are spaced apart so that by varying the length of the strut, by driving a motor 770 that turns the worm screw 745, the display is tilted. If the worm screw is rotated in one direction, the length of the variable length strut increases. If the worm screw is rotated in an opposite direction, the length of the variable length strut is reduced. Increasing the length of the variable length strut tilts the display support and thus the display forwards. Reducing the length of the variable length strut causes the display and display support to be tilted backwards. The motor is driven to shorten or lengthen the strut responsive to a customer pressing a corresponding user button. It will be appreciated that whilst certain embodiments of the present invention have been described with respect to a display that pivots about a lower edge, certain other embodiments could be provided in which the display pivots about an upper edge in which case a further end of the variable length strut could be pivotably connected to the terminal at an upper region rather than via the floor surface 766.

The further end of the worm screw 745 extends towards the further housing 755 and is connected to the further housing by a coupling connection 780 which includes a stiff spring 785. This helps decouple any impact on the screen by absorbing impact force. The stepper motor and worm drive are thus parts of a stiff arm assembly that can extend and retract as the motor rotates. The motor is run in a closed loop mode giving precise and reliable motion control. The direct drive scheme offers a stiff support for the display. This rigidity is helpful in terms of the usability of the touchscreen and replicates the normal solid feel associated with traditional fixed display systems. In order to protect the drive and the display from damage during casual attack or any vehicle contact, the shaft can optionally include a stiff spring to de-couple any impact being translated directly through the motor.

Figure 8:
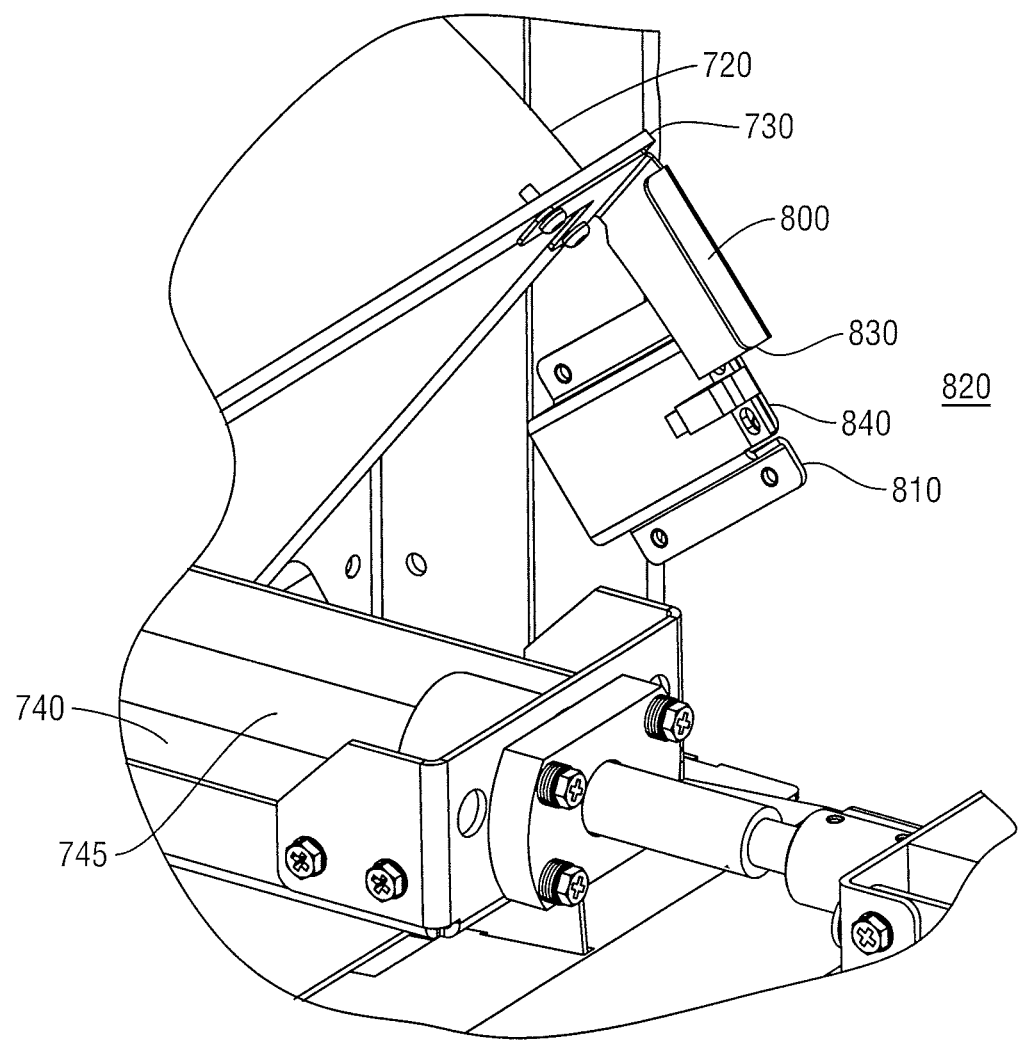
FIG. 8 illustrates how the location of a display can be sensed.

FIG. 8 illustrates a way in which the location of the inner hood 720 and thus the angle of tilt of the display support that it is part of (and thus the angle of tilt of the display) may be determined. As illustrated in FIG. 8, a flag 800 which is a rigid body, such as a piece of metal or the like is secured to the lip 730 of the hood 720 and moves with the hood. A sensor 810 is fixed in place with respect to the terminal by being secured to a side panel 820 of the terminal. As the worm screw 745 is rotated, the hood 720 moves corresponding to tilting of the display support. This movement causes an edge region 830 of the flag to move into an orifice 840 of the sensor where the appearance of the flag may be detected and/or the disappearance of the flag may be detected. Aptly, a "home" position is provided for the terminal. The display and display support are driven to the home position either by pressing of a corresponding "home" button on the front of the ATM or after a pre-determined time-out period has elapsed. Subsequent to either of these events occurring, the motor 770 is driven to rotate the worm screw 745 to tilt the display and display support until the flag is detected at a desired position. It will be appreciated that other techniques could of course be utilized to determine the location of the display.

The motor is run in a close link mode giving precise and reliable motion control. At switch-on the motion system homes to a known fixed position. A slotted optical sensor 810 is used to signal this exact position and allows the stepper motor to facilitate motion forward or backwards of this home position. FIG. 8 illustrates the flag that sweeps through an arc as the display moves. The homing procedure involves the motor slowly running until the flag enters a slot in the sensor. The motion is then reversed and halted once the sensor changes state. This is the home position indicated and is very predictable. Pressing one or more of the user control buttons signals to the motor that a new position is required. The motor responds by comparing its current position with the new position and uses a trapezoidal profile including an acceleration phase, steady speed phase and deceleration phase to move to the new location. In this mode, the user buttons used to tilt the display are disabled. This helps simplify drive control and also helps to reduce learning time for a cardholder/user of the ATM. Optionally, motion control can be tied into a customer application. This allows the display to return to its "home" position after a customer transaction is complete. This is another option as opposed to returning the display to the "home" position after a fixed time-out of no activity. Optionally, customer preferences may be tied to a cardholder/user of the ATM allowing an auto-set up of the display at the start of any transaction with a user who has pre-stored a preferred "home" position. Thus, a cardholder would verify/identify themselves by inputting a user card and PIN and pre-stored positional information would be utilized to drive the display to a pre-determined position automatically.

FIGS. 9*a*, 9*b*, and 9*c* illustrate the position of the display in three separate orientations and illustrates the inner hood 720 and frame 205 in more detail. As with all fixed display drive-up ATMs, the external environment can introduce several issues with water management. A traditional approach has been to seal the machine with numerous gaskets. This approach is difficult to achieve with a tilting screen solution due to moving parts which move in and out of the terminal. As these parts move, gaps can appear. Certain embodiments of the present invention overcome this problem, and also help reduce unauthorized access to the inner parts of the user terminal utilizing a water management scheme. As shown in FIG. 9*a*, certain embodiments of the present invention ensure that there are limited gaps between an outer hood 900 which is affixed to or integrally formed with the frame 205 surrounding the aperture in the ATM and an inner hood 720 which is part of the display support. The outer hood 900 and inner hood 720 are rigid arcuate bodies and a gap 901 between an outer surface of the inner hood and inner surface of the outer hood is kept to as small a distance as possible so that as the display tilts forwards and backwards a minimal pathway is provided for ingress of water. Optionally, a wiper 910 is carried on the display support at an upper edge of the display. This is sealed at an inner surface to the display and abuts with an inner surface of the outer hood 900 to urge water in a forwards direction shown by arrow A in FIG. 9*a* as the display is tilted forwards. In addition to the outer and inner hood, a gasket 920 is provided along the lower edge of the display. This gasket 920 rocks in a concave gully 930 which extends along the bottom of the frame 205. FIG. 9*a* illustrates the display in a slightly tilted back orientation. FIG. 9*b* illustrates the display in a more tilted back orientation. FIG. 9*c* illustrates the display in a tilted forward orientation. In the orientation shown in FIG. 9*c* the lip 730 which is an outwardly turned portion of the inner hood 720 is illustrated in a position in which it is almost in contact with the edge 735 of the frame. This is an orientation similar to that shown in FIG. 7.

Figure 10:
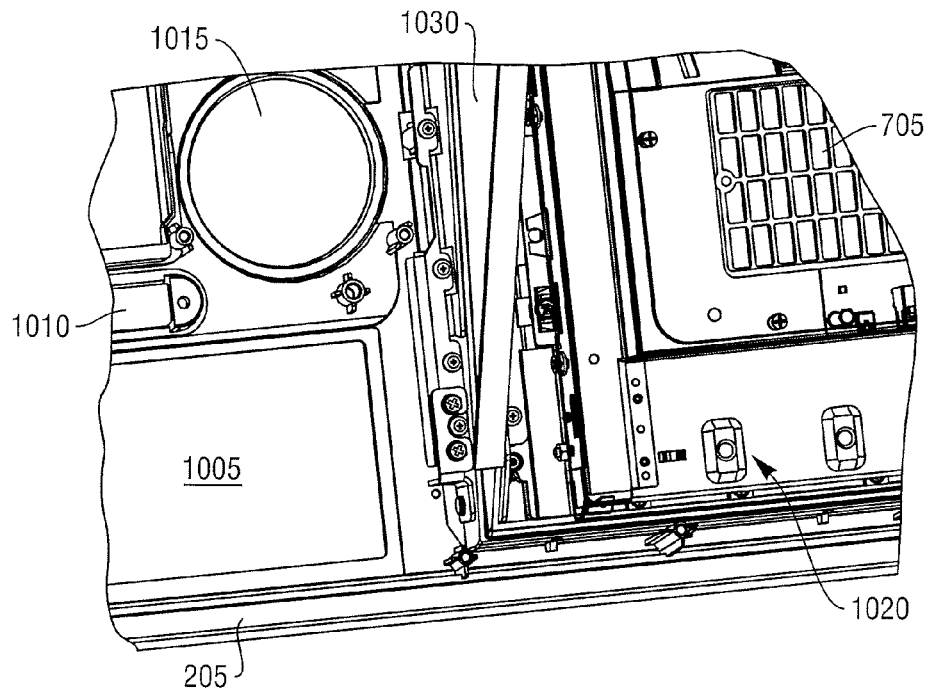
FIG. 10 illustrates how a display support pivots.

FIG. 10 illustrates a reverse side of the frame 205 which extends across the principal (largest) aperture of the ATM fascia 207. The frame 205 includes a keyboard aperture 1005 which receives the encrypting keypad module 104. The frame 205 also includes an audio port aperture 1010 which receives an audio port 220. The frame 205 also includes a card reader/writer aperture 1015 which receives a moulding 210 defining a card reader/writer slot. A further principal frame aperture 1020 is provided in the frame 205 and this defines the open mouth in which the display 102 itself is tilted forwards and backwards. FIG. 10 helps illustrate the reverse of the display support 201 and helps illustrate how this is pivotably connected to the frame 205 at a lower edge region at both sides of the display support 201.

FIG. 10 also helps illustrate how the hood 720 carried by the display support 201, referred to as an inner hood, has side panels 1030 which extend up to the arcuate hood top. The side panels (one shown in FIG. 10) help shield the sides of the back of the display 102 when the display 102 is tilted outwards into a tilted forward orientation. This helps prevent ingress of rainwater or other contaminants or prevents unauthorized access.

Figure 11:
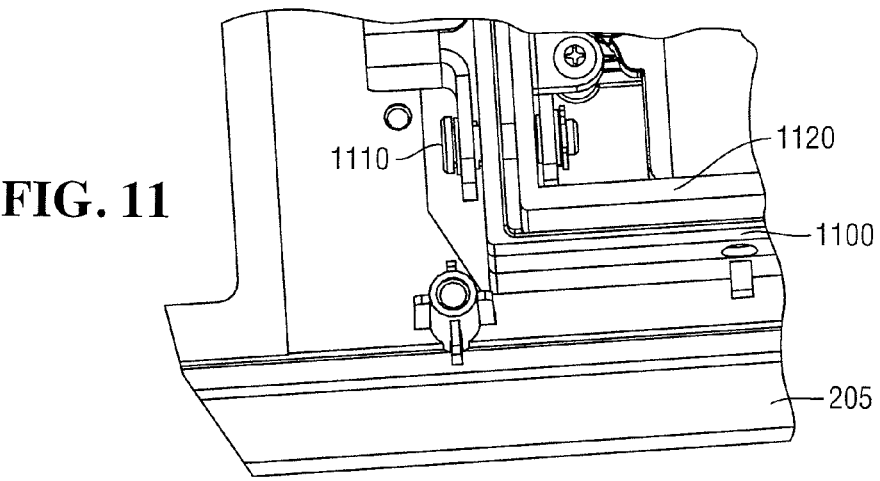
FIG. 11 illustrates a pivot point of the display support.

FIG. 11 illustrates how a flange 1100 extends around the principal aperture 1020 in the frame 205. The flange 1100 is a lip which extends substantially at right angles to the principal plane of the frame 205. A pivot pin 1110 extends through an aperture in the flange 1100 and a corresponding flange 1120 which extends out of the display support. An inner surface of the flange 1100 of the frame is concave to form a gully 930. An outer surface of the flange 1120 of the display is substantially convex and formed as a gasket that rides in the gully. A similar pivoting arrangement is provided on the remaining side (not shown) of the display.

Figure 12:
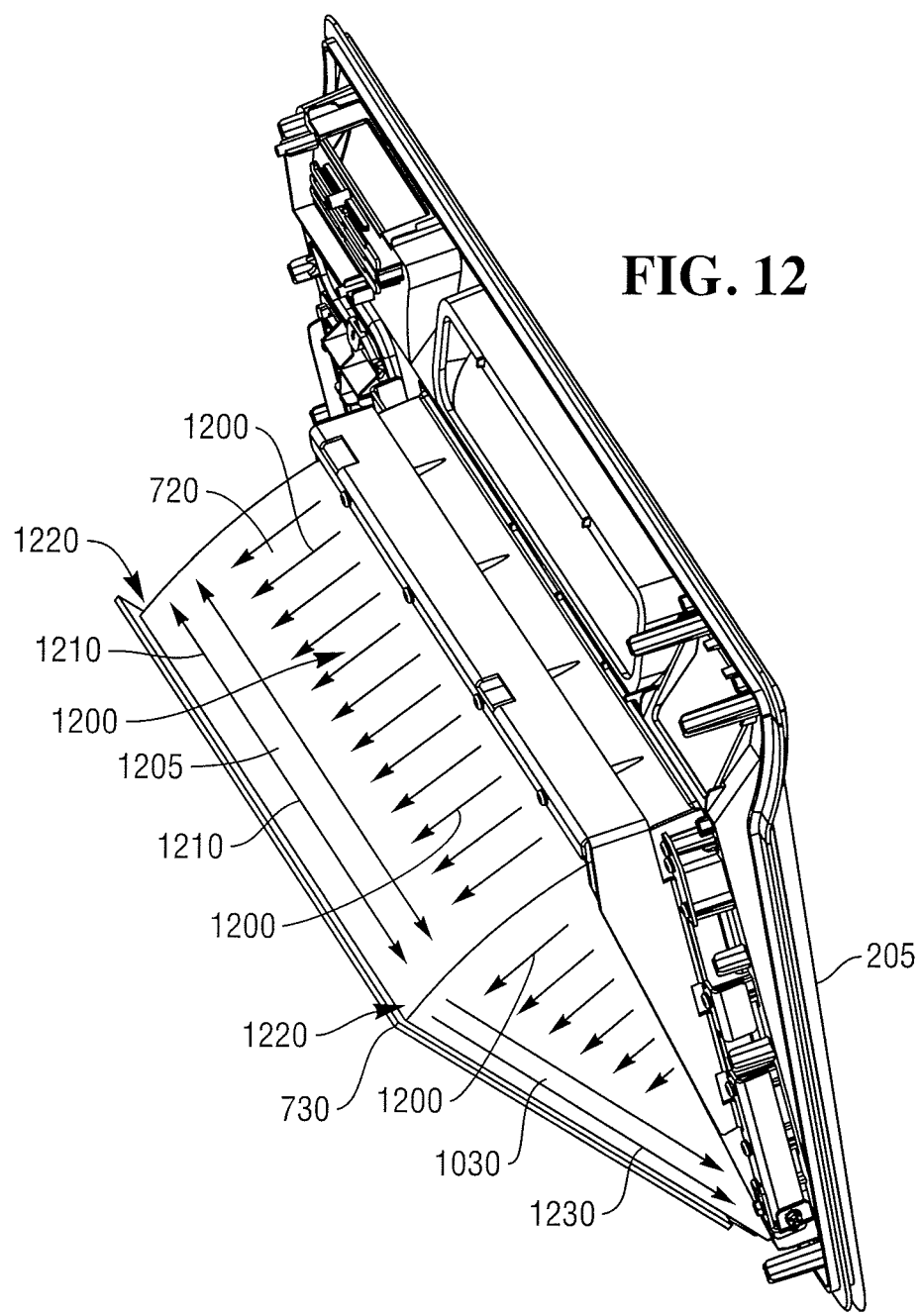
FIG. 12 illustrates a display hood in more detail.

FIG. 12 illustrates the frame 205 which is secured to the front of the ATM and extends around a main aperture 206 provided in the front fascia 207. FIG. 12 helps illustrate the inner hood 720 and shows the upper arcuate panel which is at an upper region of the display support 201 and one of the two substantially triangular side panels 1030 which extend from the upper arcuate panel. FIG. 12 also helps illustrate motion of incoming water with the various arrows 1200 which are shown. It will be understood that the hood illustrated in FIG. 12 is in the position in which a display is tilted back, that is to say, is tilted within the terminal. The inner hood 720 is thus angled back at its maximum with respect to the frame 205. In this position, any rainwater will follow the path shown by the multiple arrows 1200 which extend at about ninety degrees to the front plane of the frame 205. These arrows indicate the flow of water between the inner hood 720 and the outer hood which is part of the frame. The arrows thus indicate the pathway of rainwater as it flows in around the edges of the display support within the inner recesses of the terminal. The flow of rainwater indicated by these arrows 1200 is halted by the lip 730. Rainwater will collect at this lip region and will thereafter flow outwards from a central region 1205 along the lip illustrated by the arrows 1210 extending around the upper lip. The water will then flow, by virtue of gravity, around a corner 1220 of each side of the inner hood and down the sides of the inner hood in the direction shown by the long arrows 1230 in FIG. 12. Water then gathers at the bottom of the display in the gully, shown more clearly in FIGS. 13 and 14. More particularly, FIG. 13 illustrates an embodiment of the present invention in which the gully 930 includes drainage holes 1300 which are arranged along the bottom of the gully in a line. The drainage holes are spaced apart so that water flowing from the inner hood downwards and water collecting on the display screen and flowing down collects in the gullies and can then flow through the drainage holes via a fluid communication pathway to an area outside the terminal. FIG. 14 illustrates an alternative embodiment of the present invention in which the gully 930 in the frame 205 includes a series of grills 1400. These grills 1400 are elongate throughholes or slits grouped together in a substantially parallel arrangement with groups 1410 of grills being spaced apart along the length of the gully. These slits allow collected rainwater to flow out of the terminal.

Figure 15:
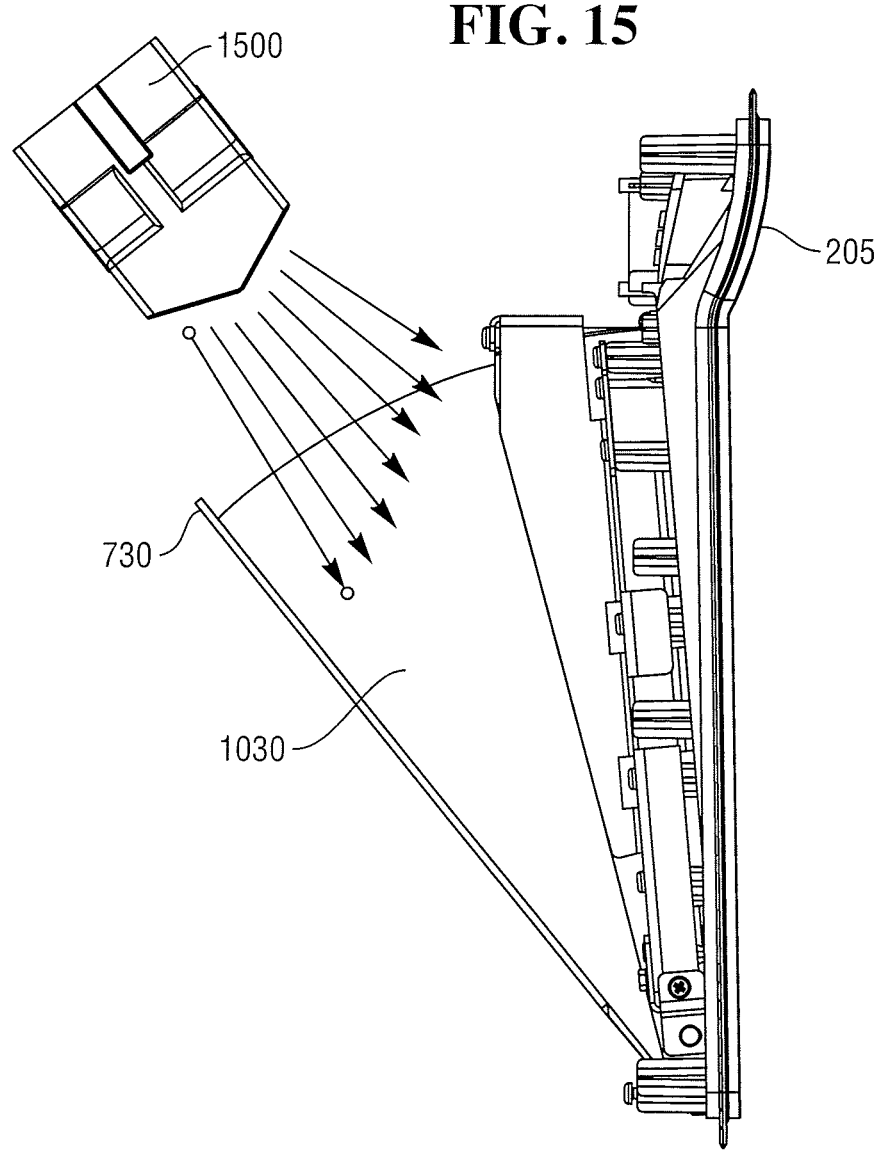
FIG. 15 illustrates the use of a heated blower which is part of a water management system.

FIG. 15 illustrates how an optional blower 1500 which can be a heated blower or a non-heated blower of air can be positioned so as to blow air in a direction substantially opposite to the direction of the arrows 1200 shown in FIG. 12 at the top of the inner hood 720. This thus helps prevent flow of rainwater into the inside of the ATM 100. Utilizing a heated blower helps prevent freezing of incoming rainwater when environmental temperatures are low. This would otherwise freeze motion of the display due to an accumulation of ice between moving parts. One, two or more blowers may of course be utilized.

Certain embodiments of the present invention provide a tilting display which is adjustable to a customer's requirements. This enhances the customer's experience providing the customer with an optimal viewing angle. This is particularly advantageous in drive-through ATMs due to the varying styles and sizes of vehicles that approach them.

Certain embodiments of the present invention provide a customer with the option to manipulate a display viewing angle. Certain embodiments utilize a three button scheme which allows a cardholder to select one of three fixed angles. This is achieved utilizing a linear worm screw with direct coupling to the display. This provides accurate positional control, simple assembly in terms of part count and maintenance and also flexible operation. Also, the selection of a viewing angle is made simple for a user by virtue of there being only three options available, each of which is selected by pressing a respective user button. The display is mounted on a pivoting axle. A stepper motor and worm drive are part of a stiff arm assembly that can extend and retract as the motor rotates. The motor is run in a closed loop mode giving precise and reliable motion control. At switch-on, the motion system homes to a known fixed position. A slotted optical sensor is used to signal this exact position and allows the stepper motor to facilitate motion forward or backwards with respect to this home position.

Optionally, a flag can be utilized that sweeps through an arc as the display moves. The homing procedure involves the motor slowly running until the flag enters a slot. The motion is then reversed and halted once the sensor changes state. This is the home position and can be detected in a very predictable manner.

Certain embodiments of the present invention provide a direct drive scheme to alter and fix the viewing angle of a display. This offers a stiff support for the display. This rigidity is advantageous in terms of the usability of the touchscreen display, particularly if the display is a touchscreen. This also replicates the normal solid feel associated with traditional fixed display systems. In order to protect the drive and the display from damage during casual attack or any vehicle contact, the shaft may optionally feature a stiff spring which is able to de-couple any impact being translated directly through the motor. Optionally, the display is returned to its "home" position after a customer transaction has been completed. Optionally, the display is returned to its "home" position after a fixed time-out period during which there is no discernible activity. Aptly, this occurs automatically after about around ten minutes of inactivity at the terminal. This helps avoid the display being left in an extended position indefinitely.

According to certain embodiments of the present invention a two button approach may be provided whereby a user can tilt the display in one of two directions by selecting and pressing one of two optional user buttons carried on the display or adjacent to the display. This provides a simple and immediately understandable method of conveying how the tilting apparatus operates.

According to certain embodiments of the present invention a water management system is introduced at an ATM. As with all drive-through ATMs the external environment surrounding the ATM can introduce several issues with water management. A traditional approach has been to seal the machine with numerous gaskets. This approach is difficult to achieve with a tilting screen solution due to parts moving in and out of the machine. Certain embodiments of the present invention provide a solution to this which involves limiting water ingress as much as possible and then managing any water ingress to move the water away from and/or out of the machine. This can be achieved by utilizing limited gaps between moving parts and providing an outer bezel/hood and inner bezel/hood. Optionally, a wiper blade or gasket can be utilized to limit water ingress. Any water that does make its way into the terminal can be managed so that the water flows along pre-determined pathways. This helps prevent further water ingress into the unit and/or water ingress into undesirable regions. The water can subsequently be managed across and down either side of a display using drainage holes or grills to move the water out of the terminal. Optionally, the addition of a blower heater or air conditioning unit can be utilized to help prevent water ingress and/or prevent freezing.

In other embodiments, the display 102 may be a non-touchscreen type in which case a further array of user buttons (function defined keys (FDKs)) may be provided on opposing sides of the display support 201 to allow user selections to be made.

In other embodiments, the tiltable display may be provided on a self-service terminal other than an ATM, or on a lobby or through-the-wall ATM rather than a drive-up ATM.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus that directs ingress of fluid around a able display of a Self-Service Terminal (SST), the apparatus comprising:
a display support that supports the tiltable display and that is pivotably mounted at an edge region thereof to the SST, the display support including a frame element providing a bezel region proximate to an outer peripheral edge of the display support and an inner hood element that extends from an upper edge region of the display support towards an interior of the SST, and wherein the display support including three-buttons, at least one button an illuminated single press button which when pressed causes the tiltable display to tilt, and wherein the inner hood element moves as part of the display support and an outer hood element that remains fixed and does not move with the inner hood element, a gap between the inner hood element and the outer hood element having a pathway for allowing the inner hood element to move while the outer hood element remains fixed, the display support also includes a wiper sealed on an inner surface of the tiltable display and abuts an inner surface of the outer hood element to urge any water present in the pathway in a direction towards the tiltable display; and
a gasket element on the display support which moves with the display support as the display support pivots, the gasket element situated along a lower edge region of the display support, the gasket element rocks in a concave gully as the inner hood element extends from the upper edge region, the concave gully extends along a bottom of the display support.

2. The apparatus of claim 1 further comprising:
a lip on the inner hood element and extending outwardly from a main body of the display support to manage flow of any water moving into the SST.

3. The apparatus of claim 1, further comprising a frame element including a gully defining at least one drainage hole.

4. The apparatus of claim 2, wherein the outer hood element is spaced apart from but proximate to the inner hood element by the pathway.

5. The apparatus of claim 3, wherein the frame element defines an abutment surface.

6. The apparatus of claim 1, wherein the apparatus further comprises an air blower that blows air onto at least the inner hood element.

7. The apparatus of claim 6, wherein the air blower blows heated air onto at least the inner hood element to prevent freezing of incoming rainwater when environmental temperatures are low.

8. A method of directing ingress of fluid around a tiltable display of a Self-Service Terminal (SST), the method comprising:
pivoting a tiltable display mounted at an edge region thereof within a display aperture of the SST;
wherein the display includes a gasket element which moves with the display as the display pivots, the gasket element situated along a lower edge region of the display, the gasket element rocks in a concave gully as an inner hood element extends from an upper edge region, the concave gully extends along a bottom of the display, and wherein the display includes a frame element providing a bezel region proximate to an outer peripheral edge of the display and the inner hood element that extends from the upper edge region of the display towards an interior of the SST, and wherein frame element includes three-buttons, at least one button an illuminated single press button which when pressed causes the tiltable display to tilt, and wherein the inner hood element moves as part of the display and an outer hood element that remains fixed and does not move with the inner hood element, and a gap between the inner hood element and the outer hood element having a pathway for allowing the inner hood element to move while the outer hood element remains fixed, the frame element also includes a wiper sealed on an inner surface of the tiltable display and abuts an inner surface of the outer hood element to urge any water present in the pathway in a direction towards the tiltable display;

sealing around the display aperture of the SST by the gasket element as the display pivots.

9. The method of claim 8, further comprising: using a lip defined by the inner hood element and extending outwardly from a main body thereof to manage flow of any water moving into the SST.

10. The method of claim 9, further comprising using a gully defining at least one drainage hole to drain water away from the display of the SST.

11. The method of claim 8, further comprising: blowing air onto at least the inner hood element coupled to a display support that supports the tiltable display.

12. The method of claim 11, further comprising: blowing heated air onto at least the inner hood element to prevent freezing of incoming rainwater when, environmental temperatures are low.

13. Apparatus that directs ingress of fluid around a tiltable display of a Self-Service Terminal (SST), the apparatus comprising:

a display support that supports the tiltable display and that is pivotably mounted at an edge region thereof to the SST, wherein the display support including a frame element providing a bezel region proximate to an outer peripheral edge of the display support and an inner hood element that extends from an upper edge region of the display support towards an interior of the SST, and wherein the display support including three-buttons, at least one button an illuminated single press button which when pressed causes the tiltable display to tilt, wherein the inner hood element moves as part of the display support while and an outer hood element that remains fixed and does not move with the inner hood element, and a gap between the inner hood element and the outer hood element having a pathway for allowing the inner hood element to move while the outer hood element remains fixed, the display support also includes a wiper sealed on an inner surface of the tiltable display and abuts an inner surface of the outer hood element to urge any water present in the pathway in a direction towards the tiltable display;

the frame element including a gully defining at least one drainage hole; and a gasket element along the lower edge of the display support which rocks in the gully during moving of the display support, the gasket element situated along a lower edge region of the display support, the gasket element rocks in a concave gully as the inner hood element extends from the upper edge region, the concave gully extends along a bottom of the display support.

14. A method of directing ingress of fluid around a tiltable display of a Self-Service Terminal (SST), the method comprising:

pivoting a tiltable display mounted at an edge region thereof to the SST and providing a frame element having a bezel region proximate to an outer peripheral edge of the display and an inner hood element that extends from an upper edge region of the display towards an interior of the SST, and wherein the frame element includes three-buttons, at least one button an illuminated single press button which when pressed causes the tiltable display to tilt, and an outer hood element that remains fixed frame and does not move with the inner hood element, and a gap between the inner hood element and the outer hood element allowing the inner hood element to move while the outer hood element remains fixed, the frame element also includes a wiper sealed on an inner surface of the tiltable display and abuts an inner surface of the outer hood element to urge any water present in the pathway in a direction towards the tiltable display;

using a gasket element situated along the lower edge of the frame which rocks in the gully during moving of the display support, the gasket element situated along a lower edge region of the frame, the gasket element rocks in a concave gully as the inner hood element extends from the upper edge region, the concave gully extends along a bottom of the frame element;

using a lip defined by the inner hood element and extending outwardly from a main body thereof for managing flow of any water moving into the SST; and using a gully defining at least one drainage hole to drain water away from the display of the SST.

* * * * *